United States Patent [19]
Michie

[11] Patent Number: 5,337,057
[45] Date of Patent: Aug. 9, 1994

[54] NON-LINEAR RADAR RANGE SCALE DISPLAY ARRANGEMENT

[75] Inventor: Terry K. Michie, Olathe, Kans.

[73] Assignee: AlliedSignal Inc., Morris Township, Morris County, N.J.

[21] Appl. No.: 88,958

[22] Filed: Jul. 12, 1993

[51] Int. Cl.$^5$ ............................ G01S 7/10; G01S 7/06
[52] U.S. Cl. ................................. 342/176; 342/186; 342/26
[58] Field of Search ............... 342/176, 178, 179, 186, 342/26, 197

[56] References Cited

U.S. PATENT DOCUMENTS

| | | | |
|---|---|---|---|
| 3,716,860 | 2/1973 | Bechtel | 342/33 |
| 3,739,385 | 6/1973 | Bechtel et al. | 343/705 |
| 3,866,222 | 2/1975 | Young | 342/185 |
| 3,896,432 | 7/1975 | Young | 342/33 |
| 3,975,662 | 8/1976 | Janosky | 315/378 |
| 3,988,731 | 10/1976 | Young | 342/179 |
| 4,330,781 | 5/1982 | Giustiniani et al. | 342/185 |
| 4,443,797 | 4/1984 | Cramp et al. | 342/185 |
| 4,654,649 | 3/1987 | Kojima et al. | 342/147 |
| 4,823,272 | 4/1989 | Inselberg | 364/461 |

Primary Examiner—John B. Sotomayor
Attorney, Agent, or Firm—Howard G. Massung

[57] ABSTRACT

A non-linear range scale for a radar system is implemented whereby the full range capability of the system is shown with emphasis on close-in targets. The arrangement is adaptable to a variety of non-linear functions having the advantage of selection by the user to provide good close-in visibility and visibility of distant conditions simultaneously.

10 Claims, 4 Drawing Sheets

NON-LINEAR RADAR RANGE SCALE DISPLAY ARRANGEMENT

BACKGROUND OF THE INVENTION

Users of radar systems experience a problem when, for example, using the radar system for guiding an aircraft through thunderstorms and other adverse weather conditions. Such users are aware of adverse weather conditions in close proximity to the craft. In order to be aware of adverse weather conditions beyond a presently selected range scale of the radar system, the user needs to constantly switch from close-in to distant range scales. Failure to do this for one reason or another can result in potentially hazardous flying situations.

Prior art radar systems utilize linear range scales. That is to say, the displayed distance is directly proportional to the actual distance. The present invention, on the other hand, features a non-linear range scale which emphasizes the close-in range relative to a more distant range. With this arrangement, close-in targets such as weather disturbances are displayed larger and with substantial detail while more distant disturbances are displayed in a manner so as to alert the user to same.

SUMMARY OF THE INVENTION

This invention contemplates a non-linear radar range scale display arrangement wherein close-in targets are displayed with substantial detail, while more distant targets are simultaneously discernable. For example, when using a radar system for detecting weather disturbances, a displayed weather pattern might be that of a long frontal weather disturbance. With prior art radar systems, only the first ten miles or so in front of the system antenna/receiver would be seen, perhaps showing only a single target or weather cell. To alleviate this situation, the scale displayed in accordance with the present invention is proportional to the logarithm (log) to the base ten of the range (R). The displayed scale can be commensurate with a variety of non-linear functions in addition to log R as aforenoted, such as the square root of R, or $R^a$, where "a" is a positive value less than one. The selection of a specific non-linear function is dependent upon how much emphasis is required on close-in versus distant ranges.

DETAILED DESCRIPTION OF THE INVENTION

Figure 1:
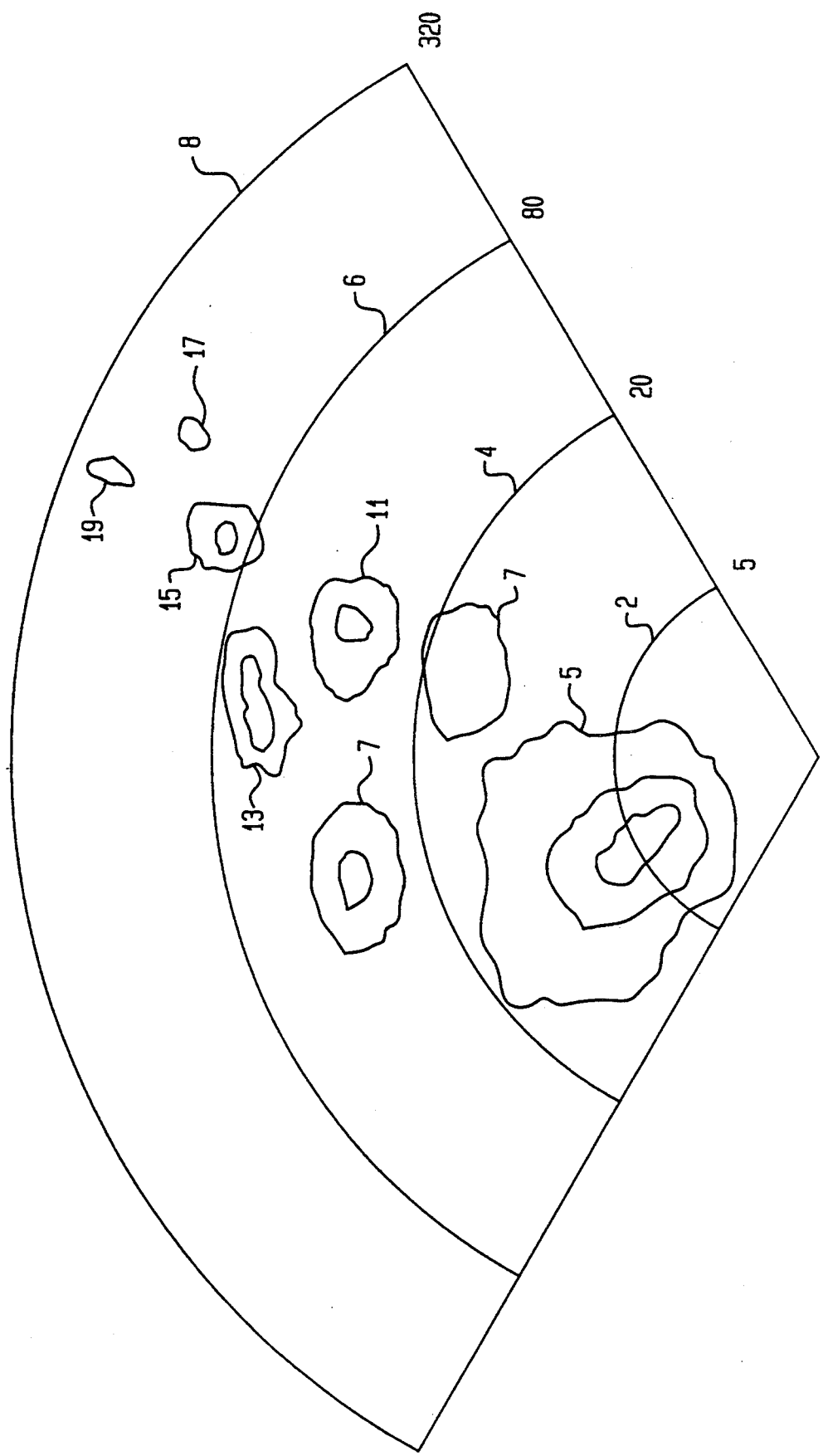
FIG. 1 is a diagrammatic plan view representation illustrating a particular non-linear radar range scale.

In implementing the invention, values for a plurality of range rings are determined for a non-linear scale. With reference to FIG. 1, four such rings are shown and are designated by the numerals 2, 4, 6 and 8. Range ring 8 is at full distance, range ring 6 is at three-quarter distance, range ring 4 is at one-half distance and range ring 2 is at one-quarter distance. Part of a target such as a weather cell 5 is within ring 2; the rest of target 5 and most of a target 7 are within ring 4; the rest of target 7 and targets 9, 11, 13 and part of a target 15 are within ring 6; and the rest of target 15 and targets 17 and 19 are within ring 8. The weather pattern depicted might be typical of a long frontal weather pattern. With a non-linear range scale the close targets are shown in detail, but it can be discerned that the front extends for a long distance in front of an observer. With the above in mind, consider the following:

$$D = (\log R)/K, \quad (1)$$

where D equals displayed distance (1.0 is full scale); R equals radar range in nautical miles (nm) and K is a constant to normalize the radar range to the displayed range.

For outer ring 8, D equals 1. Thus substituting appropriate values in equation (1), the following is obtained:

$$1 = (\log 320)/K, \quad (2)$$

where K equals 2.505.

For ring 6, log R equals 0.75×2.505, or R equals 75.7 nm, nominally 80 nm, as shown in the Figure. Similarly, for ring 4, log R equals 0.5×2.505 or R equals 17.9, nominally 20 nm, and for ring 2 log R equals 0.25×2.505, or R equals 4.2, nominally 5 nm, as also shown in FIG. 1.

Figure 2:
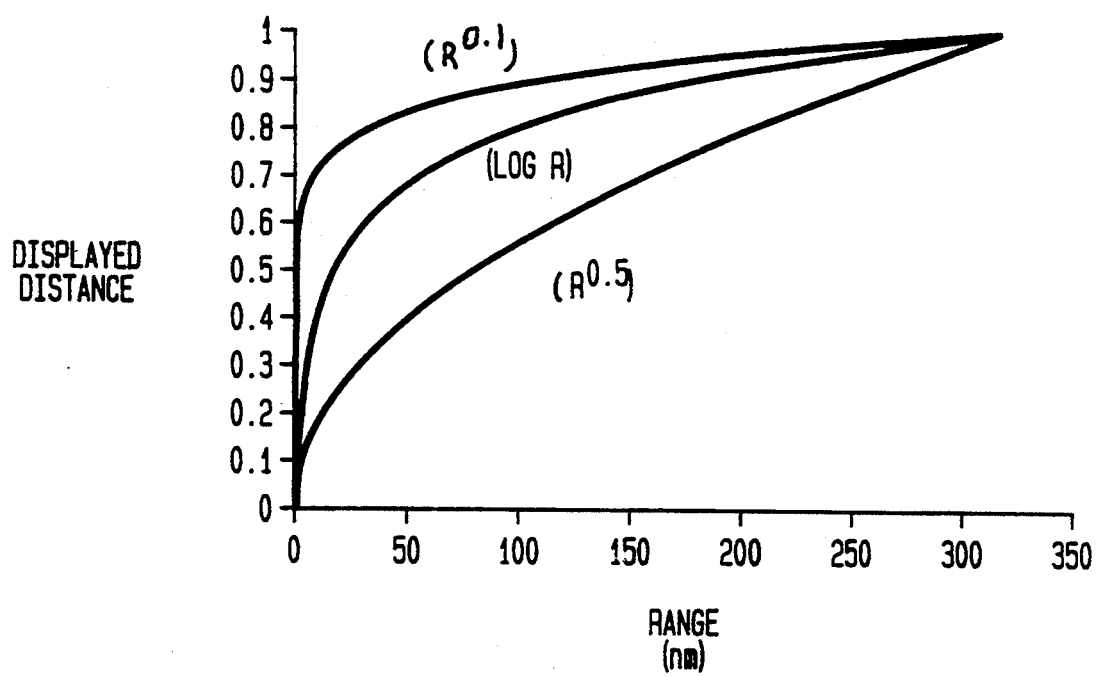
FIG. 2 is a graphical representation illustrating displayed distance (D) versus radar range (R) for the non-linear functions log R, $R^{0.5}$ and $R^{0.1}$ as contemplated by the invention.

In order to judge as to which non-linear function would be most desireable for use with a particular radar system, several non-linear functions are plotted, as illustrated in FIG. 2. Thus, FIG. 2 shows curves obtained by plotting displayed distance against radar range for the following three non-linear functions: log R; $R^{0.5}$; and $R^{0.1}$. For purposes of illustration, the selected function for implementation is the log R function, since this function appears to provide the best compromise of resolution and display area utilization, as is desireable.

Figure 3:
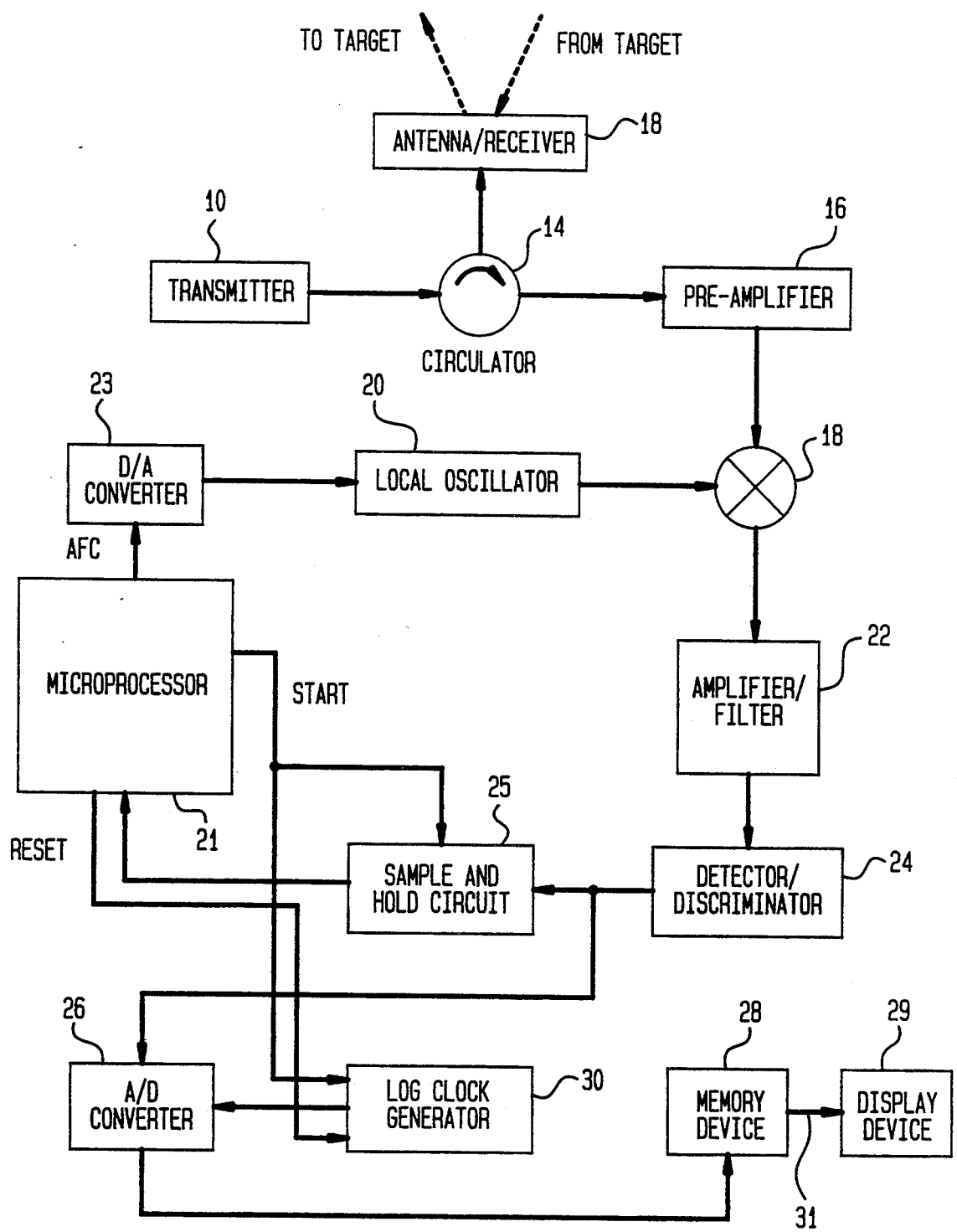
FIG. 3 is a block diagram of a radar system incorporating the features of the invention.

To best understand the aforenoted implementation, reference is made to the weather radar system block diagram illustrated in FIG. 3. Thus, a transmitter is designated by the numeral 10. Transmitter 10 may be a magnetron which is connected to an antenna/receiver 12 via a circulator 14.

Pulses are directed from antenna 12 to a target such as a weather cell as shown in FIG. 1. The pulses are reflected from the target to antenna/receiver 12 and are directed to a preamplifier 16 via circulator 14 so as to provide an amplified signal. The amplified signal is mixed by a mixer 18 with a signal from a local oscillator 20. Mixer 18 mixes the frequencies of the amplified signal from pre-amplifier 16 and the signal from local oscillator 20 to provide an intermediate frequency (IF) signal. Local oscillator 20 is driven by an automatic frequency control (AFC) signal provided by a microprocessor 21. Microprocessor 21 also provides a START signal and a RESET signal for purposes to be hereinafter described. Signal AFC is a digital signal which is converted to an analog signal by a digital to analog (D/A) converter 23 and the analog signal drives the local oscillator. The mixed signal from mixer 18 is amplified and filtered by an amplifier/filter 22. The amplified and filtered signal is detected by a detector/discriminator 24.

Detector/discriminator 24 provides an analog signal which is applied to a sample and hold circuit 25. Sample and hold circuit 25 is responsive to the START signal from microprocessor 21 for applying a sampled and held signal to the microprocessor.

The analog signal from detector/discriminator 24 is converted to a digital signal by an analog to digital (A/D) converter 26 which is driven by a log clock generator 30. The digital signal is stored in a memory device 28 to be later applied to a display device 29 in an appropriate format. In this regard, it is noted that display device 28 is an external device and is connected to memory device 28 by a self-clocking high speed bus 31.

Log clock generator 30 provides a proper clock frequency to quantize a selected non-linear radar range scale to the actual radar range scale. In this regard, it will be understood that the round trip time for the pulses from and to antenna/receiver 12 is approximately 12.35 μs per nm. To create a log R range scale, a clock generator must be provided that varies its frequency logarithmically with time. Log clock generator 30 which is responsive to the START and RESET signals from microprocessor 21 and which, in turn, drives memory device 28 through A/D converter 26 serves this purpose.

Figure 4:
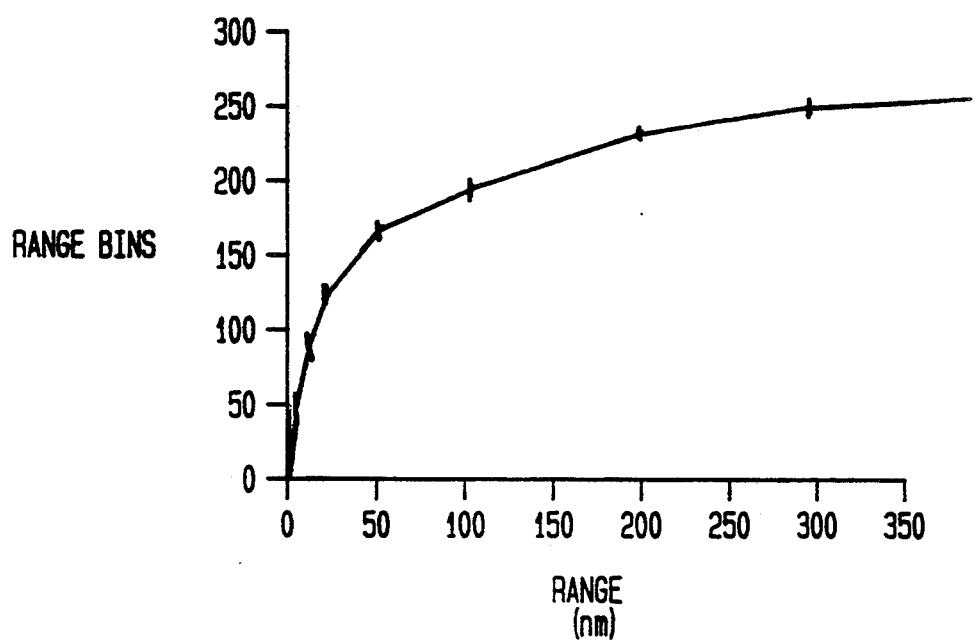
FIG. 4 is a plot of the piece-wise linear approximation of range bins versus range for the particular non-linear function log R.

The approach taken to configure log clock generator 30 is to use a "piece-wise" linear approximation to the actual clock signal desired and, in this regard, reference is made to FIG. 4 which is a plot of the "piece-wise" linear approximation of range bins versus range. With eight linear range segments, the desired log R function is obtained with reasonable accuracy. It is to be noted that this approach is adaptable to any particular non-linear function, with the log R function being described for illustration purposes.

Figure 5:
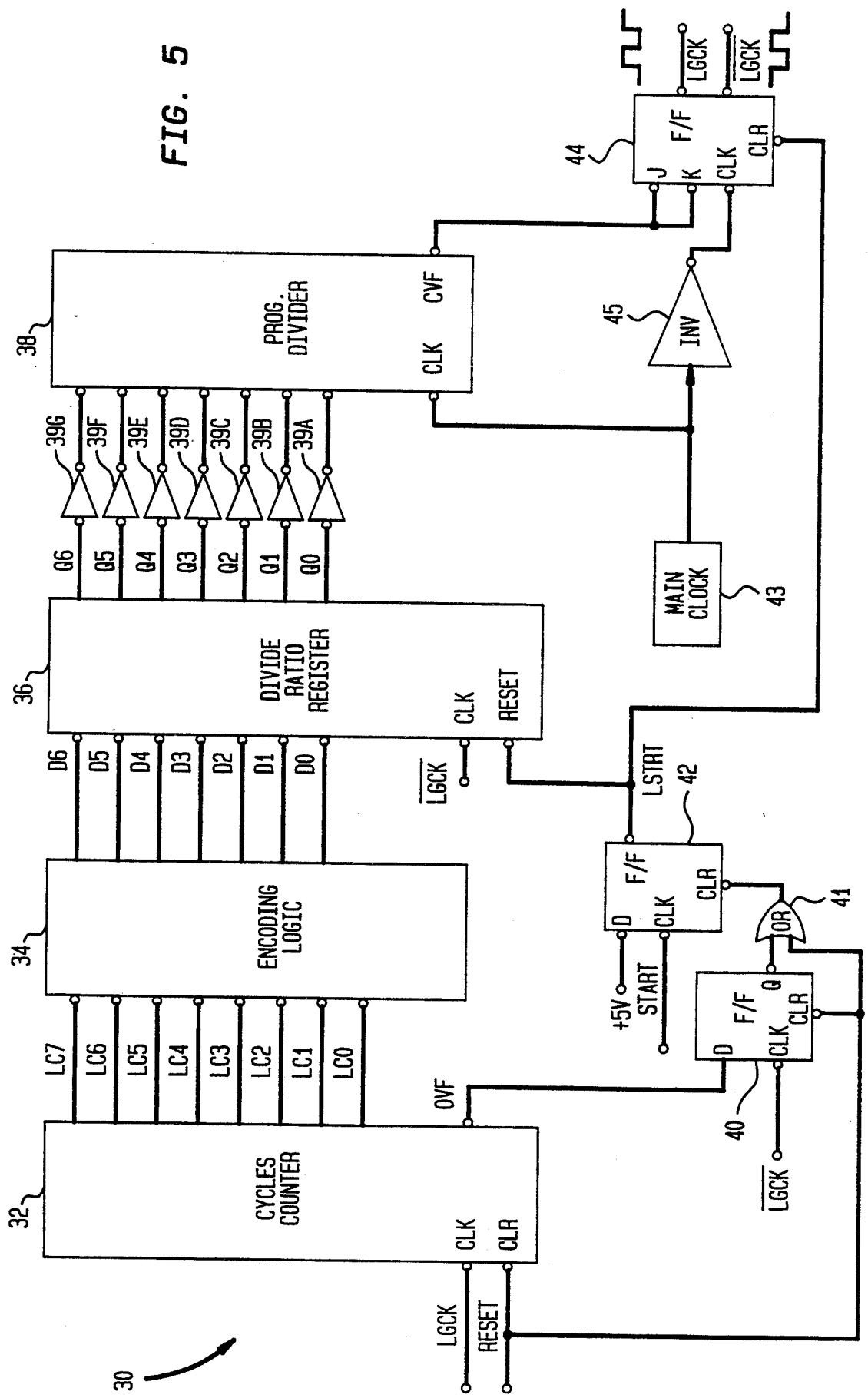
FIG. 5 is a block diagram particularly showing a log clock generator shown generally in FIG. 3.

FIG. 5 is a block diagram of log clock generator 30 shown generally in FIG. 3. Thus, log clock generator 30 includes four basic components: a cycles counter 32; encoding logic 34; a divide ratio register 36; and a programmable divider 38. The arrangement is such that log clock generator 30 provides a pre-set clock frequency for a predetermined number of clock cycles and then switches to a frequency at one-half that rate. The new clock rate is active for a predetermined number of clock cycles before switching occurs to the next frequency, now one-quarter of the original. This repeats for a total of eight different frequencies.

The function of cycles counter 32 is to count the number of range bins produced. The radar system contemplated uses a total number of two hundred fifty-six range bins for a complete range scale. The following table outlines the switching points for the overall function of log clock generator 30.

| Segment | Divide Ratio | Range Bins | Preload |
|---------|--------------|------------|---------|
| 1 | 2 | 51 | 255 |
| 2 | 4 | 39 | 254 |
| 3 | 8 | 38 | 252 |
| 4 | 16 | 29 | 248 |
| 5 | 32 | 29 | 240 |
| 6 | 64 | 39 | 224 |
| 7 | 128 | 25 | 192 |
| 8 | 256 | 6 | 128 |
|   |   | 256 total |   |

Encoding logic 34 which is connected to cycles counter 32 via eight cycles counter outputs (LC0-LC7) monitors the output of cycles counter 32, looking for a match for the aforementioned switching points and provides outputs D0-D6. When a switching point is observed, an appropriate preload value is sent to a seven bit divide ratio register 36. Divide ratio register 36 holds the preload values listed in the table above. Divide ratio register 36 drives programmable divider 38 through inverters 39A-39G.

A "D" type flip-flop (F/F) 40 is connected at an input D to an overflow output (OVF) of cycles counter 32; a "D" type flip-flop (F/F) 42 is connected at a clear (CLR) input to the output of an OR gate 41; and a "J-K" type flip-flop (F/F) 44 is connected at its J and K inputs to an overflow output (OVF) of programmable divider 38. OR gate 41 receives an output (Q) from flip-flop 40 and the RESET signal from computer 21.

A clock output from a main systems clock 43 which may be a crystal oscillator is applied to a clock input (CLK) of programmable divider 38 and is applied through an inverter 45 to a clock input (CLK) of flip-flop 44. All of the 39A-39G inverter outputs are set to a logic "1" by a logic start signal (LSTRT) applied to a reset input of divide ratio register 36 from flip-flop 42 and are applied to programmable divider 38. Signal LSTRT is applied to a clear (CLR) input of flip-flop 44. The RESET signal from computer 21 clears cycles counter 32 and flip-flop 40 and 42, which when applied to a clear (CLR) inputs thereof resets the system. A preload value of all logic "1's" causes an overflow condition (OVF) to always be present at the output of programmable divider 38 so that the output of J - K flip-flop 44 toggles with every clock pulse, creating a divide by two output, i.e. LGCK and $\overline{\text{LGCK}}$. Output LGCK is applied to the clock input (CLK) of cycles counter 32 and output $\overline{\text{LGCK}}$ is applied to the clock input (CLK) of divide ratio register 36 and to the clock (CLK) input of flip-flop 40. As the bits in divide ratio register 36 are cleared, the proper preload value is obtained. - With reference to the chart above, after two hundred fifty-six range bins have been produced, cycles counter 32 overflows setting flip-flop 40 which clears flip-flop 42 through OR gate 41, thus resetting the system awaiting the next sequence of pulses from microprocessor 21 (FIG. 3) to start another log clock sequence via the START signal from microprocessor 21.

Programmable divider 38 is a binary counter which can be programmed to produce different output frequencies. The counter starts at a preloaded value and then counts up until it overflows. The overflow condition allows the final stage, flip-flop 44, to toggle, as aforenoted. The overflow condition also causes programmable divider 38 to load the starting value. When this value is left constant, the result is a fifty percent duty cycle clock signal at a rate of one-half the overflow rate of the counter. Since the value used in the preload is programmable, the output frequency is correspondingly programmable. It should be noted that the arrangement can be used on any range scale by simply changing the main clock input.

With the above description of the invention in mind, reference is made to the claims appended hereto for a definition of the scope of the invention.

What is claimed is:

1. A non-linear radar range scale display arrangement, comprising:
   means for receiving radar signals transmitted from a target and for providing signals proportional thereto;
   oscillator means for providing oscillating signals;

control means connected to the oscillating means for controlling the frequency of the oscillating signals therefrom;

mixing means connected to the receiving means and to the oscillator means for mixing the proportional signals and the oscillating signals and for providing mixed signals;

means connected to the mixing means for detecting the mixed signals and for providing detected mixed signals;

means connected to the detecting means for sampling and holding the detected mixed signals, and connected to the control means and controlled thereby for applying sampled and held signals to the control means;

clock generator means connected to the control means and controlled thereby for quantizing a selected non-linear radar range scale to an actual radar range scale and for providing quantized signals;

means connected to the detector means and to the clock generator means and responsive to the detected signals and the quantized signals for providing signals corresponding to the selected non-linear radar range scale; and memory means connected to the non-linear range scale signal means for storing the range scale signals and for applying said signals to a display means.

2. An arrangement as described by claim 1, wherein:

the clock generator means is operative in a sequence to provide the quantized signals at a predetermined clock frequency for a predetermined number of cycles and then switches to provide said quantized signals at other lower predetermined clock frequencies for other predetermined numbers of cycles for a predetermined number of different frequencies; and a plurality of radar range bins being produced at each switching of the clock generator.

3. An arrangement as described by claim 2, wherein the clock generator means includes:

means for counting the plurality of radar range bins.

4. An arrangement as described by claim 3, wherein the clock generator means includes:

means connected to the counting means for monitoring said counting means to detect switchings of the clock generator and for providing logic outputs upon said switchings being detected.

5. An arrangement as described by claim 4, wherein the clock generator means includes:

register means connected to the monitoring means for holding said logic outputs.

6. An arrangement as described by claim 5, wherein the clock generator means includes:

programmable means connected to the register means and programmed so as to provide different output frequencies in response to the logic outputs from the register means, with said programmable means providing an overflow output when the logic outputs are all at the same logic level.

7. An arrangement as described by claim 3, including:

the counting means providing an overflow output when a predetermined number of radar range bins have been counted; and the clock generator means including means responsive to the overflow output from the counting means for resetting the clock generator means to start another sequence thereof.

8. An arrangement as described by claim 6, including:

means for providing a clock output;

means connected to the clock output means and to the programmable means and responsive to the clock output and the overflow output from the programmable means for providing first and second toggle outputs.

9. An arrangement as described by claim 6, wherein:

the first toggle output is applied to the counting means for clocking said counting means.

10. An arrangement as described by claim 8, wherein:

the second toggle output is applied to the means responsive to the overflow output from the counting means and to the register means for clocking both of said means.

* * * * *